US012549903B2

(12) United States Patent
Hsu

(10) Patent No.: US 12,549,903 B2
(45) **Date of Patent: *Feb. 10, 2026**

(54) MICRO-SPEAKER DEVICE

(71) Applicant: Vanson Electronics (Nanhai) Co., Ltd., Foshan (CN)

(72) Inventor: Hao-Chien Hsu, Taipei (TW)

(73) Assignee: Vanson Electronics (Nanhai) Co., Ltd., Foshan (CN)

( * ) Notice: Subject to any disclaimer, the term of this patent is extended or adjusted under 35 U.S.C. 154(b) by 145 days.

This patent is subject to a terminal disclaimer.

(21) Appl. No.: 18/432,095

(22) Filed: Feb. 5, 2024

(65) Prior Publication Data

US 2024/0430620 A1 Dec. 26, 2024

(30) Foreign Application Priority Data

Jun. 20, 2023 (CN) ......................... 202310740937.1

(51) Int. Cl.

*H04R 9/02* (2006.01)
*H04R 1/02* (2006.01)
*H04R 7/18* (2006.01)
*H04R 9/04* (2006.01)

(52) U.S. Cl.

CPC ............. *H04R 9/025* (2013.01); *H04R 1/025* (2013.01); *H04R 7/18* (2013.01); *H04R 9/045* (2013.01)

(58) Field of Classification Search

CPC .......... H04R 9/025; H04R 1/025; H04R 7/18; H04R 9/045; H04R 9/06; H04R 2209/027; H04R 2400/11; H04R 9/02; H04R 9/046; B06B 1/045; H02K 33/18; H02K 5/04

See application file for complete search history.

(56) References Cited

U.S. PATENT DOCUMENTS 7,538,463 B2 * 5/2009 Miura ...................... H04R 9/02 310/20
11,490,206 B1 * 11/2022 Hsu ........................ H04R 9/043
2006/0266967 A1 * 11/2006 Miura ...................... H02K 5/04 251/129.15
2007/0164616 A1 * 7/2007 Kuwabara ............. H02K 33/18 310/15

(Continued)

FOREIGN PATENT DOCUMENTS

CN 102984631 3/2013
CN 217160006 U * 8/2022 ............... H04R 9/02

(Continued)

*Primary Examiner* — Angelica M McKinney
(74) *Attorney, Agent, or Firm* — Winston Hsu

(57) ABSTRACT

A micro-speaker includes a frame and a drum paper including a diaphragm and a surround. The diaphragm is flexibly connected to one end of the frame via the surround, thereby forming a first suspension system. A magnetic structure includes a main magnetic portion and a yoke covering and surrounding the main magnetic portion. A magnetic gap is provided between the main magnetic portion and a folded portion of the yoke. A voice coil is sleeved on an outer periphery of the main magnetic portion and penetrates into the magnetic gap. One end of the voice coil is fixedly connected to the diaphragm. A one-piece elastic member is flexibly connected to a first surface of a bottom of the yoke and a bottom surface of the frame, thereby forming a second suspension system.

20 Claims, 9 Drawing Sheets

(56) References Cited

U.S. PATENT DOCUMENTS

| | | | | |
|---|---|---|---|---|
| 2007/0236088 | A1* | 10/2007 | Miura | B06B 1/045 381/87 |
| 2024/0430619 | A1* | 12/2024 | Hsu | H04R 9/046 |

FOREIGN PATENT DOCUMENTS

| | | | | |
|---|---|---|---|---|
| CN | 115884047 | | 3/2023 | |
| CN | 116528131 | | 8/2023 | |
| CN | 220528231 | | 2/2024 | |
| JP | 2003-61173 | | 2/2003 | |
| KR | 101000757 | B1 * | 12/2010 | H04R 9/02 |
| KR | 20130029850 | A * | 3/2013 | H04R 9/045 |

* cited by examiner

MICRO-SPEAKER DEVICE

BACKGROUND OF THE INVENTION

1. Field of the Invention

The invention relates to the technical field of acoustic devices, in particular to a micro-speaker device having a dual suspension system.

2. Description of the Prior Art

A loudspeaker is a kind of transducer element that converts electrical signals into acoustic signals, and is an important acoustic component in electronic products. The micro-speaker module usually includes a frame and a magnetic system and a vibration system disposed within the frame. The vibration system includes a diaphragm and a voice coil arranged under the diaphragm. The voice coil drives the diaphragm to produce sound under the vibration of the magnetic system.

However, the vibration of the speaker diaphragm may be transmitted to the electronic product, and generate noise. Since the internal space of electronic products is very limited, how to design an effective vibration-absorbing structure on a speaker unit has become a major challenge in this technical field.

SUMMARY OF THE INVENTION

It is one object of the present invention to provide an improved micro-speaker with a dual suspension system to solve the problems raised in the background art above.

One aspect of the invention provides a micro-speaker including a frame; a drum paper comprising a diaphragm and a surround, and the diaphragm is flexibly connected to one end of the frame via the surround, thereby forming a first suspension system; a magnetic structure comprising a main magnetic portion and a yoke covering and surrounding the main magnetic portion, wherein a magnetic gap is provided between the main magnetic portion and a folded portion of the yoke; a voice coil sleeved on an outer periphery of the main magnetic portion and penetrates into the magnetic gap, wherein one end of the voice coil is fixedly connected to the diaphragm; and a one-piece elastic member flexibly connected to a first surface of a bottom of the yoke and a bottom surface of the frame, thereby forming a second suspension system.

According to some embodiments, no opening is provided at the bottom of the yoke.

According to some embodiments, the first surface is coplanar with the bottom surface of the frame.

According to some embodiments, a width of the one-piece elastic member is greater than a width of the surround.

According to some embodiments, the one-piece elastic member is an integrally formed structure.

According to some embodiments, the one-piece elastic member is a ring structure.

According to some embodiments, the one-piece elastic member is a continuous ring structure.

According to some embodiments, the one-piece elastic member is a discontinuous ring structure.

According to some embodiments, the one-piece elastic member is made of a metal sheet, a plastic sheet, a rubber sheet or a paper sheet.

According to some embodiments, the one-piece elastic member comprises an inner ring structure, an outer ring structure, and a cantilever connecting the inner ring structure and the outer ring structure.

According to some embodiments, the inner ring structure is directly connected and fixed on a periphery of the first surface.

According to some embodiments, the main magnetic portion is fixed on a second surface of the bottom of the yoke opposite to the first surface.

According to some embodiments, a periphery of the bottom of the yoke is provided with an annular recessed structure, forming an annular third surface of the bottom, which is lower than the first surface, thereby providing a buffer space between the annular recessed structure and the one-piece elastic member.

According to some embodiments, the outer ring structure is provided with a positioning recess, and corresponding to the positioning recess, the frame body is provided with a positioning protrusion, to facilitate positioning during assembly.

According to some embodiments, a linear distance between relative joints of the cantilever of the elastic member between the inner ring structure and the outer ring structure is D, and an actual length between the relative joints of the cantilever of the elastic member between the inner ring structure and the outer ring structure is L, wherein L/D is 1 to 3.

According to some embodiments, the yoke has a central opening.

According to some embodiments, the central opening is a long and narrow through-hole extending along a long axis of the yoke, and the central opening runs through an entire thickness of the yoke.

According to some embodiments, an elastic material is disposed in the central opening.

According to some embodiments, the elastic material comprises foam or rubber.

According to some embodiments, one end of the central opening is covered by the main magnetic portion fixed on the yoke.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
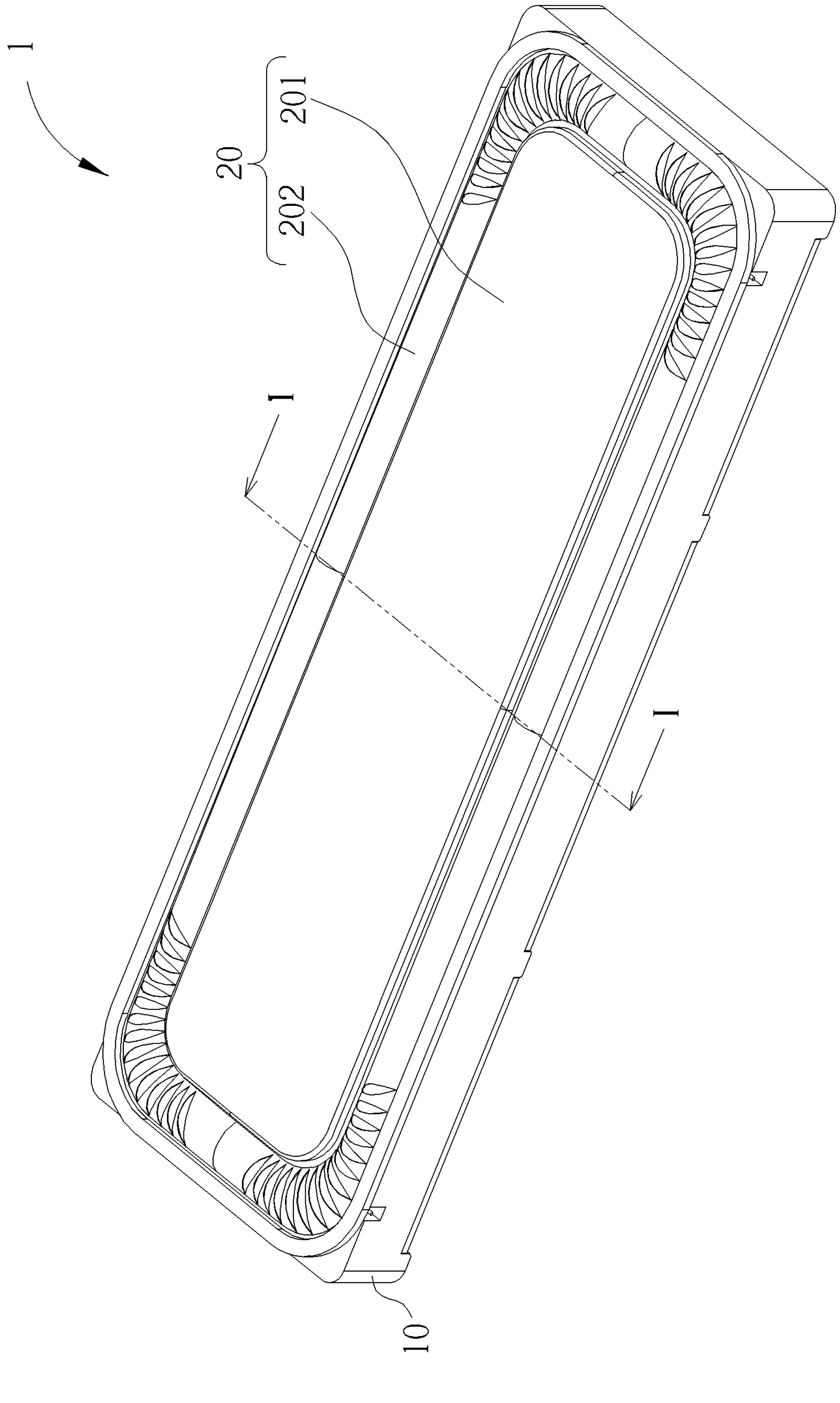
FIG. 1 is a front side view of a micro-speaker according to an embodiment of the present invention.

In order to make the objectives, technical solutions, and advantages of the embodiments of the present invention clearer, the technical solutions in the embodiments of the present invention will be described clearly and completely in conjunction with the accompanying drawings in the embodiments of the present invention. Obviously, the described embodiments are part of the embodiments of the present invention, but not all of the embodiments. Based on the embodiments of the present invention, all other embodiments obtained by those of ordinary skill in the art without creative work shall fall within the protection scope of the present invention. Therefore, the following detailed description of the embodiments of the present invention provided in the accompanying drawings is not intended to limit the scope of the claimed invention, but merely represents selected embodiments of the present invention.

In the description of the present invention, it should be understood that the terms "center", "longitudinal", "transverse", "length", "width", "thickness", "upper", "lower", "front", "back", "left", "Right", "vertical", "horizontal", "top", "bottom", "inner", "outer", "clockwise", "counter-clockwise" and other directions or the positional relationship are based on the orientation or positional relationship shown in the drawings, and is only for the convenience of describing the present invention and simplifying the description, and does not indicate or imply that the pointed device or element must have a specific orientation, be constructed and operated in a specific orientation, Therefore, it shall not be interpreted as a limitation to the present invention.

In the present invention, unless otherwise clearly defined and specified, the "above" or "below" of the first feature of the second feature may include direct contact between the first and second features, or may include the first and second features not in direct contact but through other features between them. Moreover, "above", "above" and "above" the second feature of the first feature include the first feature being directly above and obliquely above the second feature, or it simply means that the first feature is higher in level than the second feature. The "below", "below" and "below" of the second feature of the first feature include the first feature directly below and obliquely below the second feature, or it simply means that the level of the first feature is smaller than the second feature.

Figure 2:
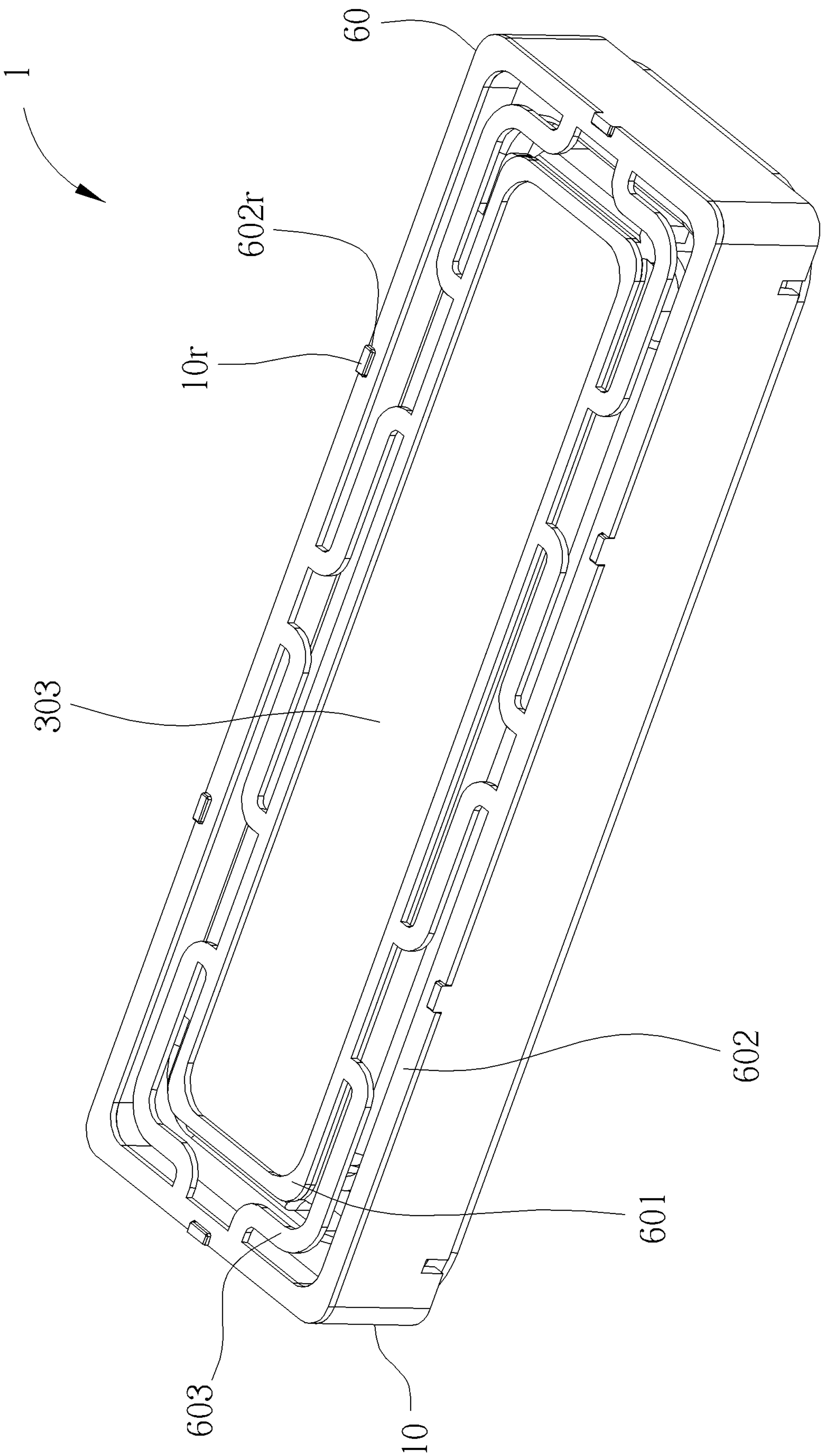
FIG. 2 is a back side view of a micro-speaker according to an embodiment of the present invention.
Figure 3:
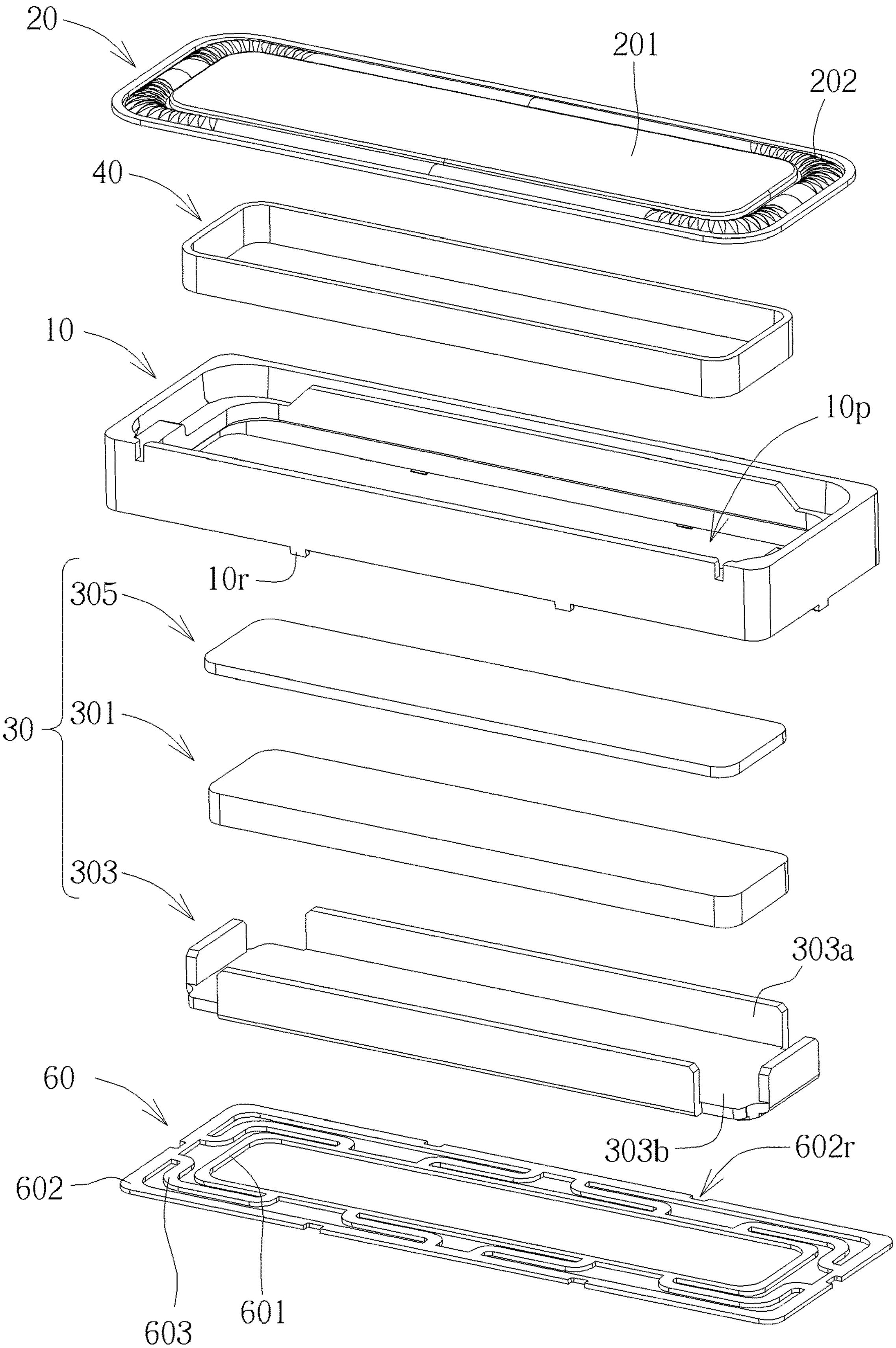
FIG. 3 is an exploded view of the micro-speaker in FIG. 1.
Figure 4:
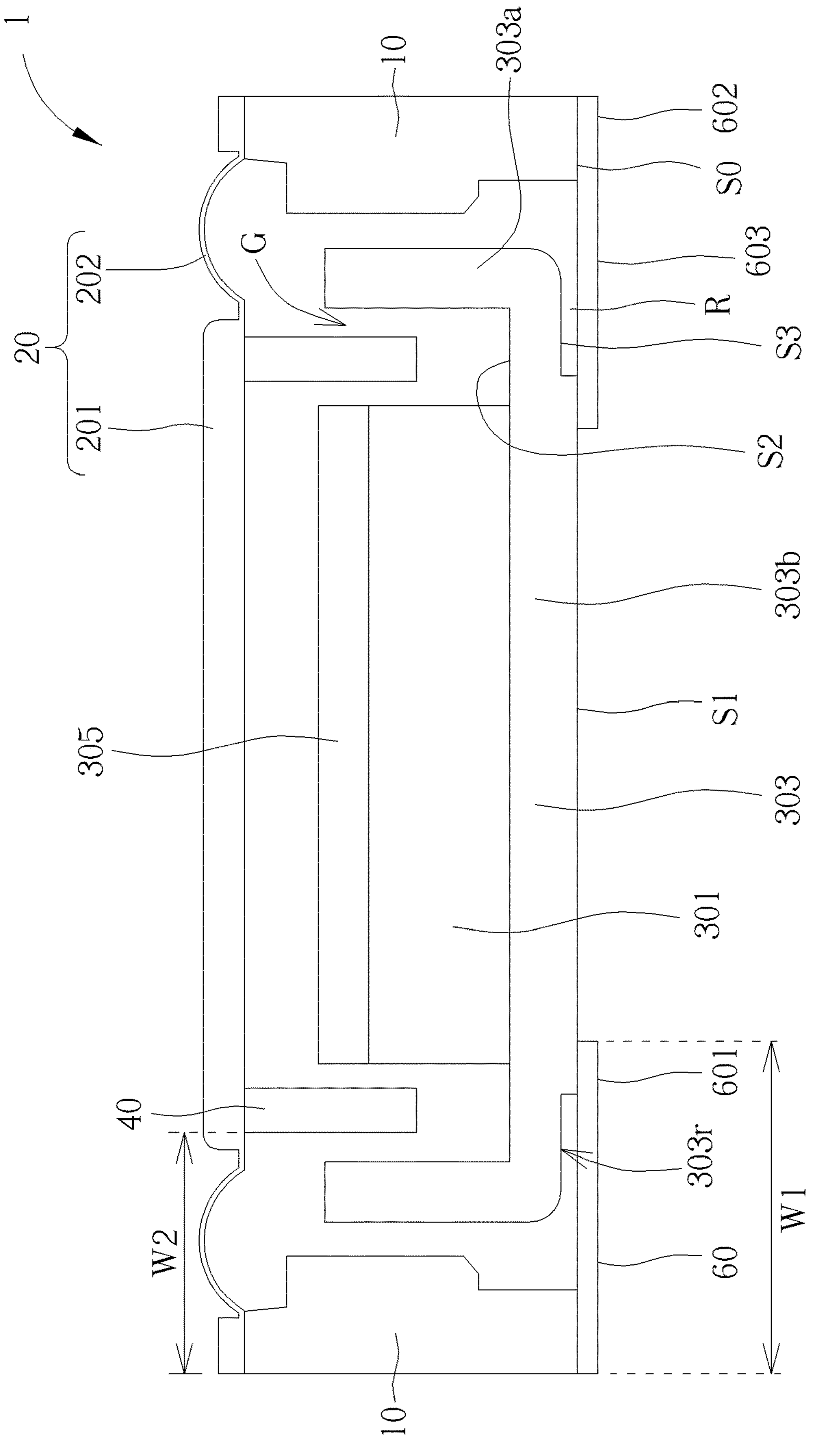
FIG. 4 is a schematic cross-sectional view taken along line I-I' in FIG. 1.
Figure 5:
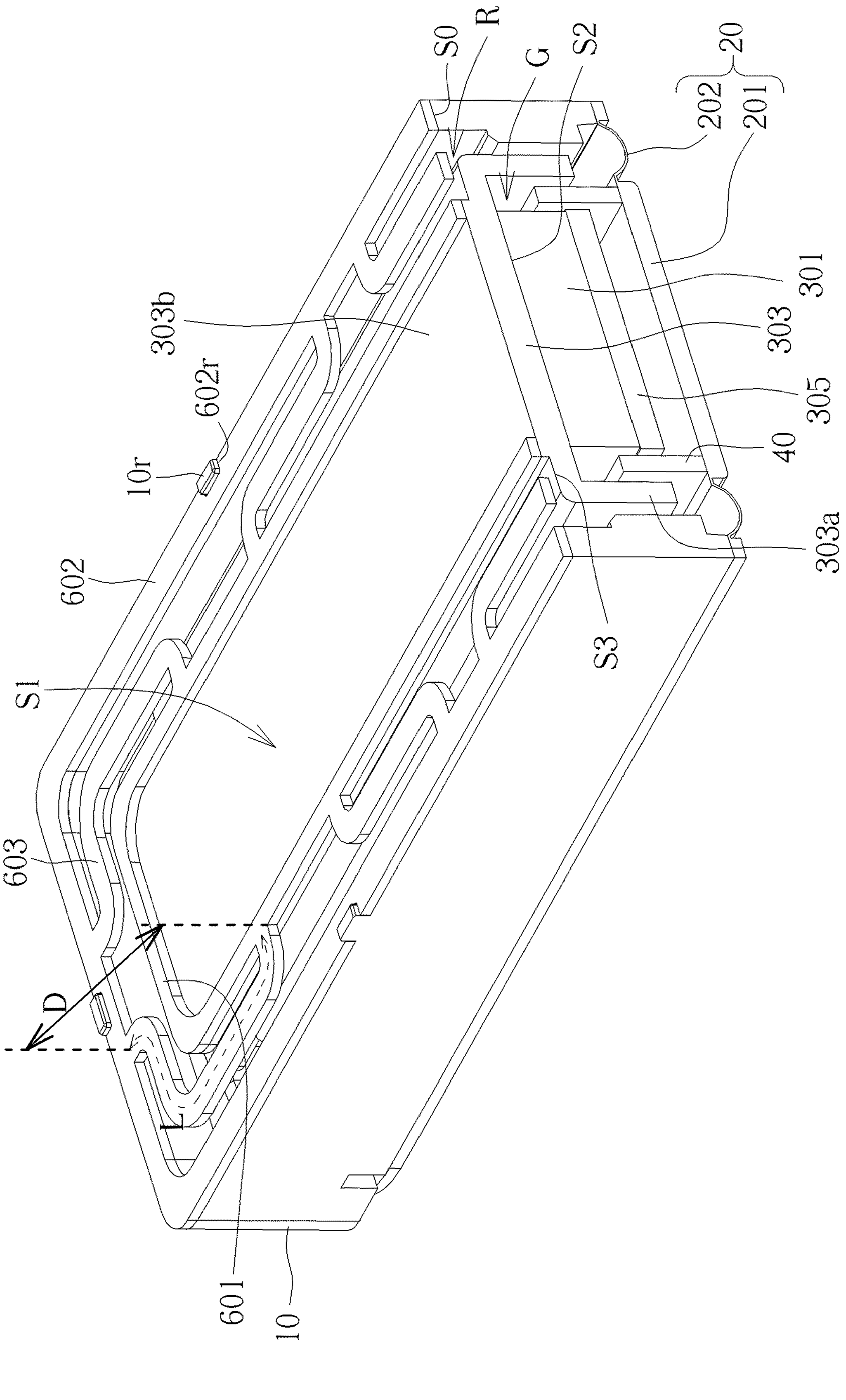
FIG. 5 is a schematic cross-sectional view of the micro-speaker.

Please refer to FIGS. 1 to 5. FIG. 1 is a front side view of a micro-speaker according to an embodiment of the present invention. FIG. 2 is a back side view of a micro-speaker according to an embodiment of the present invention. FIG. 3 is an exploded view of the micro-speaker in FIG. 1. FIG. 4 is a schematic cross-sectional view taken along line I-I' in FIG. 1. FIG. 5 is a schematic cross-sectional view of the micro-speaker.

As shown in FIG. 1 to FIG. 5, the micro-speaker 1 includes a frame 10 and drum paper 20 disposed on the frame 10. According to an embodiment of the present invention, the drum paper 20 may include a diaphragm 201 and a surround 202 around the diaphragm 201 and having an arc-shaped or wave-like cross-section. According to an embodiment of the present invention, the diaphragm 201 and the surround 202 may be made of different materials, but not limited thereto.

According to an embodiment of the present invention, preferably, the diaphragm 201 of the drum paper 20 is flexibly connected to one end of the frame 10 via the surround 202. According to an embodiment of the present invention, the diaphragm 201 is arranged in an elongated shape, that is, its dimension in the lengthwise direction is larger than its dimension in the widthwise direction. According to an embodiment of the present invention, the frame 10 has an opening 10*p* adapted to the shape of the drum paper 20 and the diaphragm 201, and the diaphragm 201 is connected to the frame 10 through the annular surround 202 to seal the opening 10*p*, thereby forming a first suspension system at one end of the frame 10.

According to an embodiment of the present invention, a magnetic structure 30 is provided in the frame 10, including a main magnetic portion 301, a yoke 303 covering and surrounding the main magnetic portion 301, and a washer 305 arranged on the main magnetic portion 301 for magnetic conduction. According to an embodiment of the present invention, the main magnetic portion 301 is fixed on the yoke 303. According to an embodiment of the present invention, as shown in FIG. 4 and FIG. 5, a magnetic gap G is provided between the main magnetic portion 301 and the folded portion 303*a* of the yoke 303.

According to an embodiment of the present invention, a voice coil 40 is disposed in the frame 10. According to an embodiment of the present invention, the voice coil 40 is formed by winding an enameled wire alone, and a bobbin is not required. The voice coil 40 is sleeved on the outer periphery of the main magnetic portion 301 and is extended into the magnetic gap G along a vertical direction. According to an embodiment of the present invention, the voice coil 40 is set in an elongated shape, that is, the size in the lengthwise direction is larger than the size in the widthwise direction, and the upper end of the voice coil 40 is fixedly connected to the diaphragm 201. Preferably, in some embodiments of the present invention, the center of the voice coil 40 is located on the central axis in the lengthwise direction of the diaphragm 201. A magnetic field is provided through the magnetic structure 30 to make the voice coil 40 vibrate, and the diaphragm 201 is driven to produce sound.

According to an embodiment of the present invention, the bottom 303*b* of the yoke 303 may not be provided with any opening. According to an embodiment of the present invention, the yoke 303 is only connected to the frame 10 through a one-piece and integrally formed elastic member 60. Therefore, the yoke 303 does not directly contact the frame 10, thereby forming a second suspension system on the other end of the frame 10.

According to an embodiment of the present invention, the elastic member 60 may be a ring structure, which is arranged around the yoke 303. According to an embodiment of the present invention, the elastic member 60 may be a continuous ring structure or a discontinuous ring structure. According to an embodiment of the present invention, for example, the elastic member 60 may be made of elastic materials such as metal sheets, plastic sheets, rubber sheets, or paper sheets. According to an embodiment of the present invention, for example, the elastic member 60 may include iron, stainless steel, aluminum and other metals, but is not limited thereto. According to an embodiment of the present invention, for example, the elastic member 60 may include polymer materials such as polyethylene naphthalate (PEN), polyethylene terephthalate (PET), polyimide (PI), etc., but not limited thereto.

According to an embodiment of the present invention, the elastic member 60 may include an inner ring structure 601, which may be directly connected and fixed on the periphery of the first surface S1 of the bottom 303*b* of the yoke 303 by using adhesive. The main magnetic portion 301 is glued and fixed on the second surface S2 opposite to the first surface S1 of the bottom 303*b* of the yoke 303. According to an embodiment of the present invention, the inner ring structure 601 may be a continuous ring structure or a discontinuous ring structure. According to an embodiment of the present invention, the elastic member 60 may include an outer ring structure 602, which may be directly connected to the bottom surface S0 of the frame 10 by using adhesive. According to an embodiment of the present invention, the outer ring structure 602 may be a continuous ring structure or a discontinuous ring structure. According to an embodiment of the present invention, the first surface S1 of the bottom 303*b* of the yoke 303 may be substantially coplanar with the bottom surface S0 of the frame 10.

According to an embodiment of the present invention, the elastic member 60 may include a cantilever 603 distributed between the inner ring structure 601 and the outer ring structure 602. The inner ring structure 601 and the outer ring structure 602 are only connected through the cantilever 603. In other words, except for the cantilever 603, the area between the inner ring structure 601 and the outer ring structure 602 is a hollow part. According to an embodiment of the present invention, the width W1 of the elastic member 60 across the yoke 303 and the frame 10 is greater than the width W2 of the surround 202 of the drum paper 20 to provide a more stable suspension function.

According to an embodiment of the present invention, the elastic member 60 is an integrally formed structure, for example, may be stamped from a single metal sheet or a plastic sheet, but is not limited thereto. According to an embodiment of the present invention, as shown in FIG. 4 and FIG. 5, the periphery of the bottom 303*b* of the yoke 303 is provided with an annular recessed structure 303*r*, forming an annular third surface S3 of the bottom 303*b*, which is lower than the first surface S1 of the bottom 303*b* of the yoke 303, thereby providing a buffer space R between the annular recessed structure 303*r* and the elastic member 60 in order to prevent the elastic member 60 from colliding with the bottom 303*b* of the yoke 303 during vibration.

According to an embodiment of the present invention, a positioning recess 602*r* can be provided on the outer ring structure 602 of the elastic member 60, and corresponding to the positioning recess 602*r*, a positioning protrusion 10*r* can be provided on the frame 10 to facilitate the positioning during assembly, improve the assembly efficiency, and make the elastic member 60 more stable during operation. According to an embodiment of the present invention, the length of the cantilever 603 of the elastic member 60 can be adjusted to achieve the desired vibration effect.

As shown in FIG. 5, the linear distance between the relative joints of the cantilever 603 of the elastic member 60 between the inner ring structure 601 and the outer ring structure 602 is D, and the actual length between the relative joints of the cantilever 603 of the elastic member 60 between the inner ring structure 601 and the outer ring structure 602 is L, wherein L/D is about 1 to 3. By adjusting the L/D ratio, the strength of the elastic member 60 and the stability during vibration can be improved Although the elastic member 60 in FIG. 3 has eight cantilevers 603, those skilled in the art should understand that the elastic member in FIG. 3 is only for illustration purposes, and the shape of the elastic member 60 and the number of cantilever 603 can be adjusted depending on the design requirements.

Figure 6:
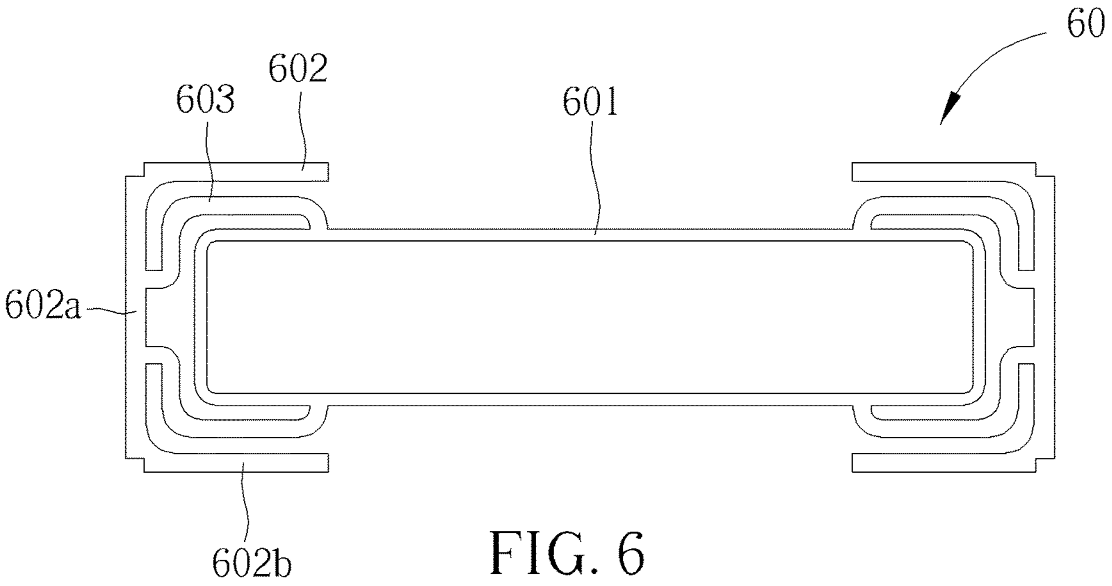
FIG. 6 to FIG. 8 illustrate various elastic member structures and cantilever configurations.
Figure 7:
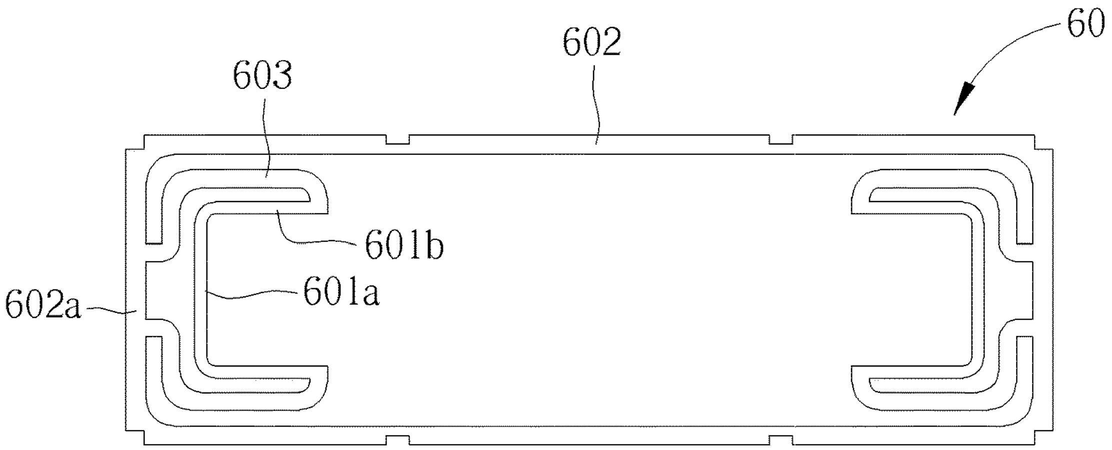
Figure 8:
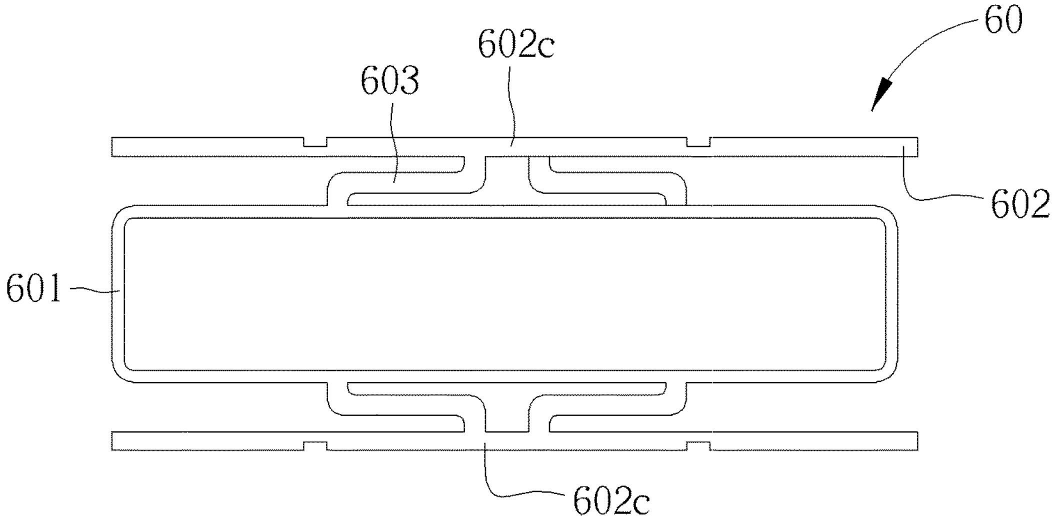

FIG. 6 to FIG. 8 illustrate various elastic member structures and cantilever configurations. As shown in FIG. 6, for example, the inner ring structure 601 of the elastic member 60 is a continuous ring structure, while the outer ring structure 602 is discontinuous. The outer ring structure 602 includes connecting portions 602*a* parallel to the narrow side of the inner ring structure 601 and connecting portions 602*b* parallel to the long side of the inner ring structure 601. The outer ring structure 602 only surrounds both ends of the inner ring structure 601. The elastic member 60 in FIG. 6 has only four cantilevers 603, and each cantilever 603 can extend from the long side 601*b* of the inner ring structure 601 and wrap around to the connecting portion 602*a* of the outer ring structure 602.

As shown in FIG. 7, for example, the inner ring structure 601 of the elastic member 60 is a discontinuous ring structure, while the outer ring structure 602 is continuous. The inner ring structure 601 includes connecting portions 601*a* parallel to the narrow side of the outer ring structure 602 and connecting portions 601*b* parallel to the long side of the outer ring structure 602. The elastic member 60 in FIG. 7 also has only four cantilevers 603, and each cantilever 603 can bend and extend from the narrow side of the outer ring structure 602 and connect to one end of the connecting portion 601*a* of the inner ring structure 601.

As shown in FIG. 8, for example, the inner ring structure 601 of the elastic member 60 is a continuous ring structure, while the outer ring structure 602 is discontinuous. The outer ring structure 602 includes two connecting portions 602*c* parallel to the long sides of the inner ring structure 601. The two ends of the inner ring structure 601 are not surrounded by the outer ring structure 602 and are open. The elastic member 60 in FIG. 8 also has only four cantilevers 603, and each cantilever 603 can bend and extend from the long side 601*b* of the inner ring structure 601 to the connecting portion 602*c* of the outer ring structure 602.

Figure 9:
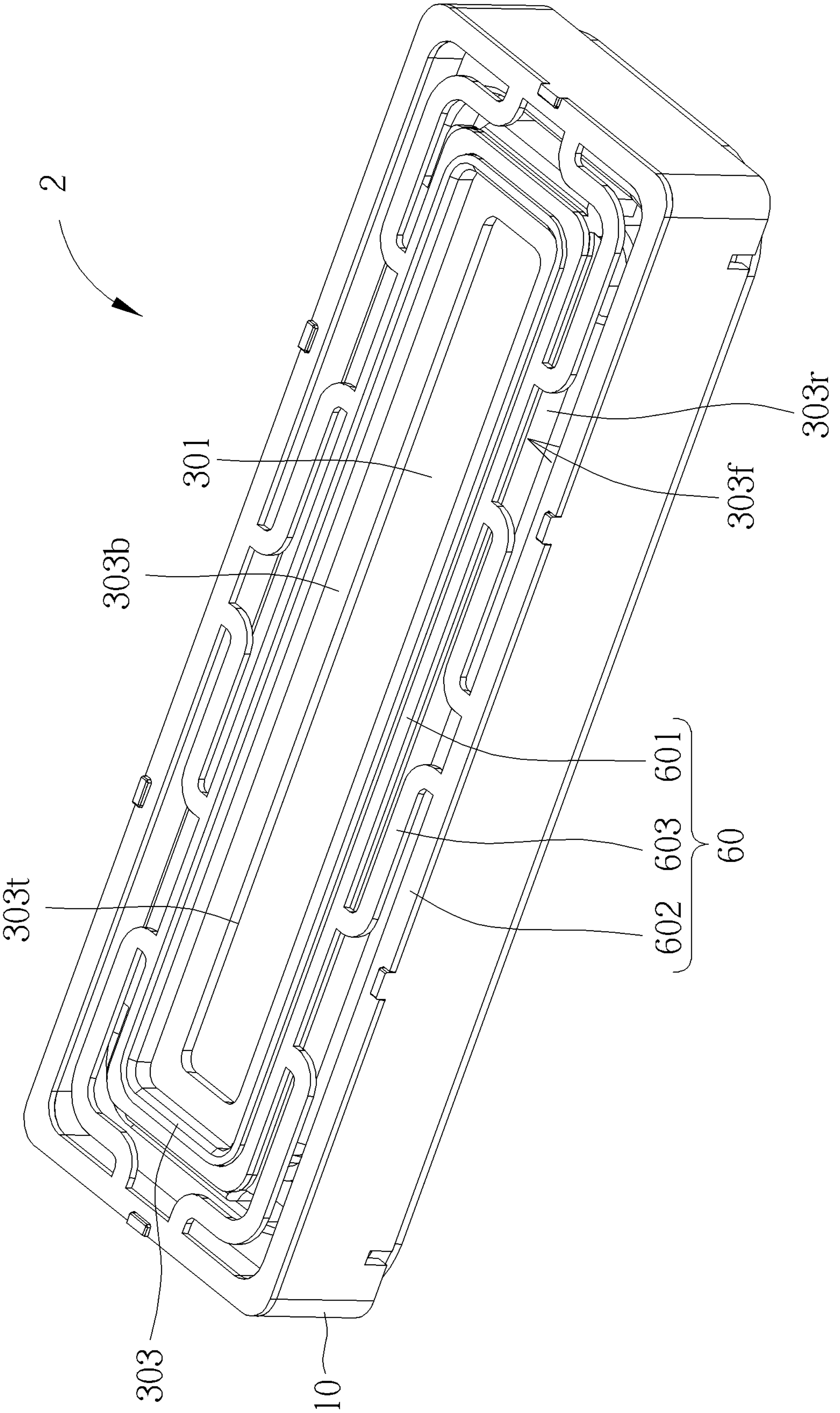
FIG. 9 is a rear side view of a micro-speaker according to another embodiment of the present invention.
Figure 10:
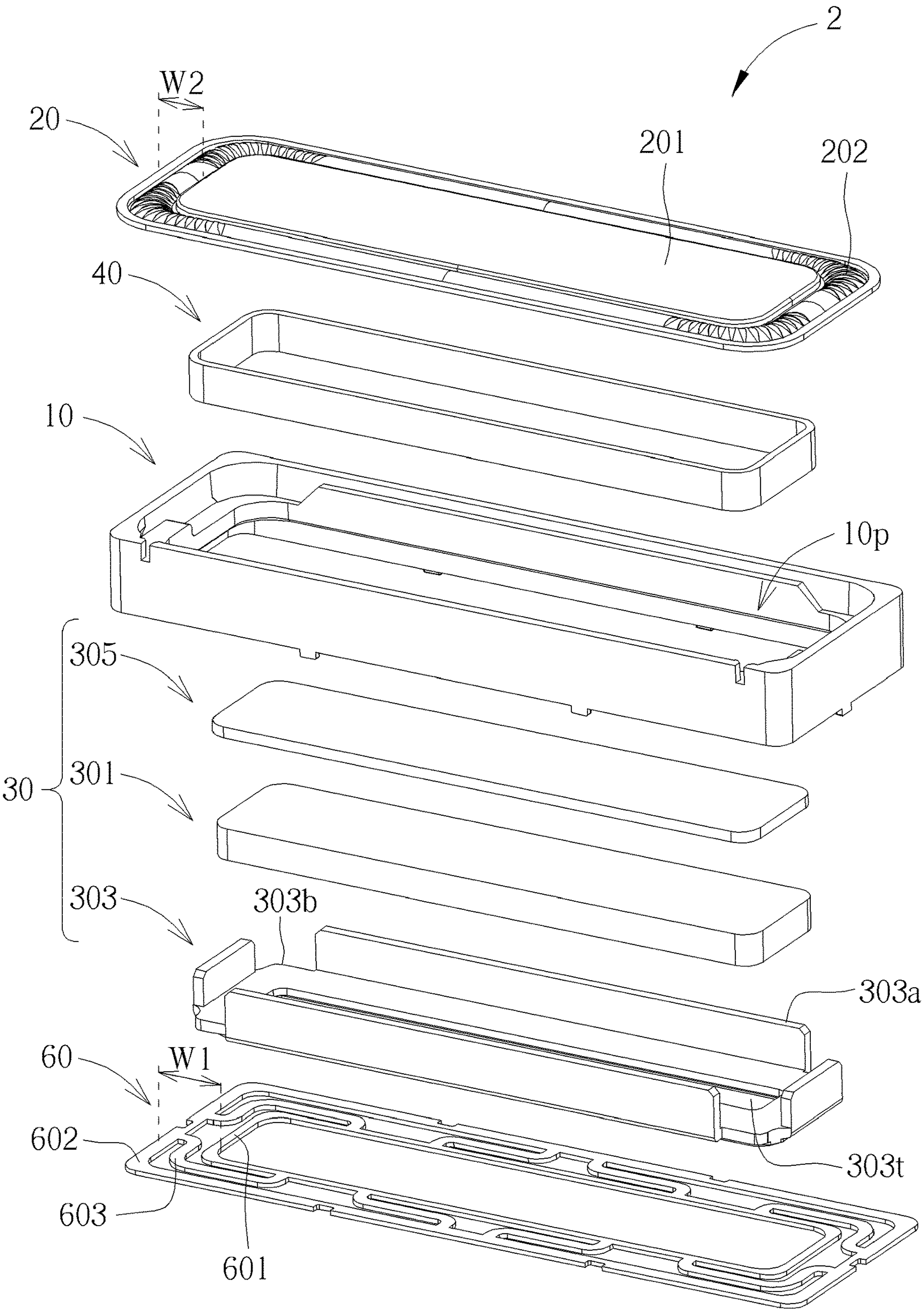
FIG. 10 is an exploded view of the micro-speaker in FIG. 9.
Figure 11:
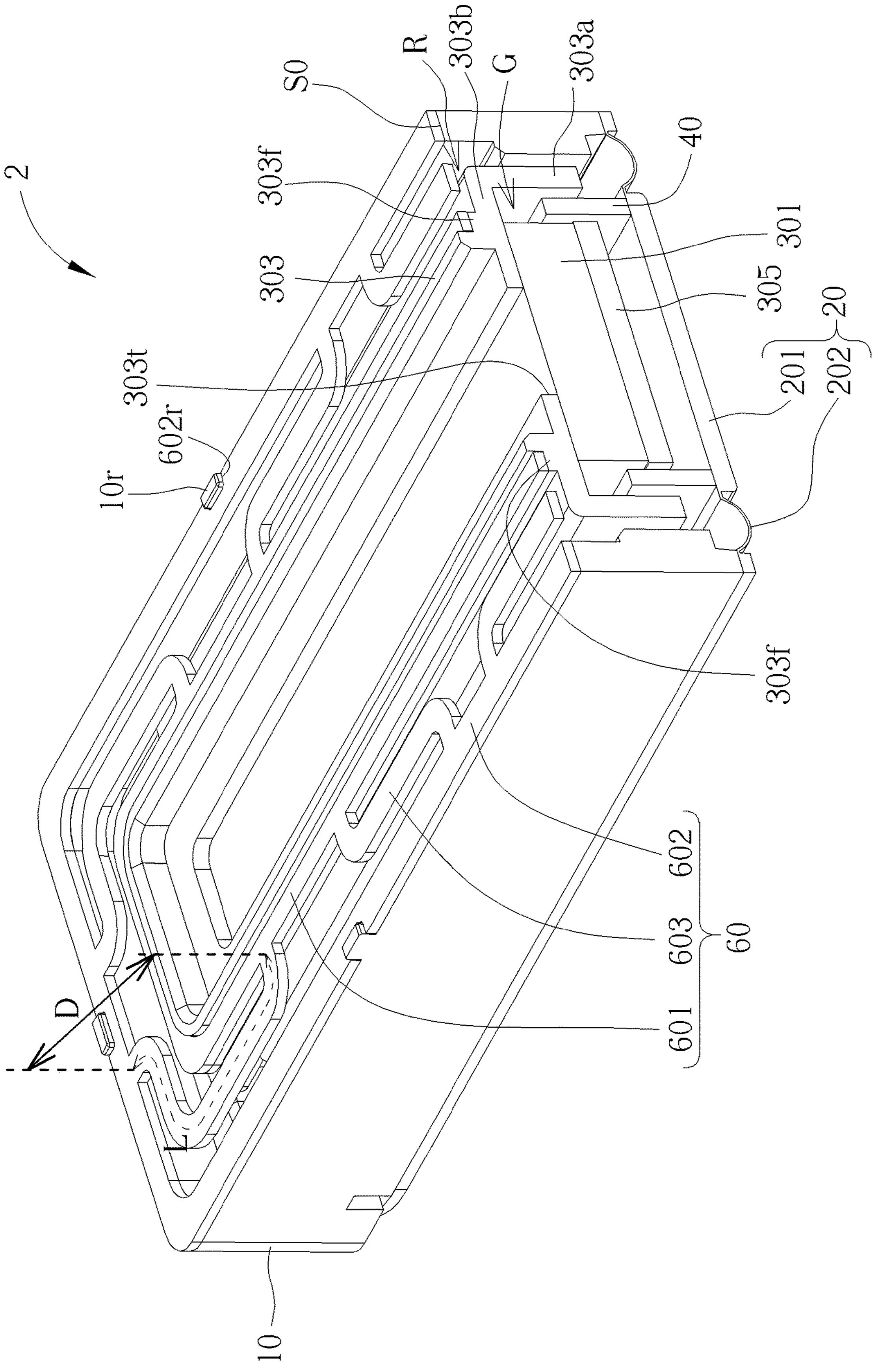
FIG. 11 is a cross-sectional schematic view of the micro-speaker.

Please refer to FIG. 9 to FIG. 11, wherein FIG. 9 is a rear side view of a micro-speaker according to another embodiment of the present invention, FIG. 10 is an exploded view of the micro-speaker in FIG. 9, and FIG. 11 is a cross-sectional schematic view of the micro-speaker, wherein like regions, materials or components are designated by like numeral numbers or labels.

As shown in FIG. 9 to FIG. 11, the micro-speaker 2 includes a frame 10 and a drum paper 20 arranged on the frame 10. According to an embodiment of the present invention, the drum paper 20 may include a diaphragm 201 and a surround 202 around the diaphragm 201 and having an arc-shaped or wave-like cross-section. According to an embodiment of the present invention, the diaphragm 201 and the surround 202 may be made of different materials, but not limited thereto.

According to an embodiment of the present invention, preferably, the diaphragm 201 of the drum paper 20 is flexibly connected to one end of the frame 10 via the surround 202. According to an embodiment of the present invention, the diaphragm 201 is arranged in an elongated shape, that is, its dimension in the lengthwise direction is larger than that in the widthwise direction. According to an embodiment of the present invention, the frame 10 has an opening 10*p* adapted to the shape of the drum paper 20 and the diaphragm 201, and the diaphragm 201 is connected to the frame 10 through the annular surround 202 to seal the opening 10*p*, thereby forming a first suspension system at one end of the frame 10.

According to an embodiment of the present invention, a magnetic structure 30 is provided in the frame 10, including a main magnetic portion 301, a yoke 303 covering and surrounding the main magnetic portion 301, and a washer 305 arranged on the main magnetic portion 301 for magnetic conduction. According to an embodiment of the present invention, the main magnetic portion 301 is fixed on the yoke 303. According to an embodiment of the present invention, as shown in FIG. 4 and FIG. 5, a magnetic gap G is provided between the main magnetic portion 301 and the folded portion 303a of the yoke 303.

According to an embodiment of the present invention, a voice coil 40 is disposed in the frame 10. According to an embodiment of the present invention, the voice coil 40 is formed by winding an enameled wire alone, and a bobbin is not required. The voice coil 40 is sleeved on the outer periphery of the main magnetic portion 301 and is extended into the magnetic gap G along a vertical direction. According to an embodiment of the present invention, the voice coil 40 is set in an elongated shape, that is, the size in the lengthwise direction is larger than the size in the widthwise direction, and the upper end of the voice coil 40 is fixedly connected to the diaphragm 201. Preferably, in some embodiments of the present invention, the center of the voice coil 40 is located on the central axis in the lengthwise direction of the diaphragm 201. A magnetic field is provided through the magnetic structure 30 to make the voice coil 40 vibrate, and the diaphragm 201 is driven to produce sound.

According to an embodiment of the present invention, the bottom 303b of the yoke 303 is provided with a central opening 303t, for example, the central opening 303t may be a narrow and long hole extending along the long axis of the yoke 303, which runs through the entire thickness of the yoke 303, but not limited to this. By setting the central opening 303t in the yoke 303, the effect of adjusting the vibration characteristics can be achieved. For example, a larger central opening 303t can be formed to reduce the overall weight of the yoke 303, or, depending on the situation, the central opening 303t can be formed and different materials can be filled to achieve different vibration effects. Alternatively, elastic materials, such as foam or rubber, can be placed in the central opening 303t to avoid collisions with other components or casings during operation. According to an embodiment of the present invention, one end of the central opening 303t may be covered by the main magnetic portion 301 fixed on the yoke 303.

According to an embodiment of the present invention, the yoke 303 is only connected to the frame 10 through the one-piece and integrally formed elastic member 60. Therefore, the yoke 303 does not directly contact with the frame 10, thereby forming a second suspension system at the other end of the frame 10 opposite to the first suspension system. According to an embodiment of the present invention, the elastic member 60 may be a ring structure, which is arranged around the yoke 303. According to an embodiment of the present invention, the elastic member 60 may be a continuous ring structure or a discontinuous ring structure. According to an embodiment of the present invention, for example, the elastic member 60 may be made of elastic materials such as metal sheets, plastic sheets, rubber sheets, or paper sheets. According to an embodiment of the present invention, for example, the elastic member 60 may include iron, stainless steel, aluminum and other metals, but is not limited thereto. According to an embodiment of the present invention, for example, the elastic member 60 may include polymer materials such as polyethylene naphthalate, polyethylene terephthalate, polyimide, etc., but is not limited thereto.

According to an embodiment of the present invention, the elastic member 60 may include an inner ring structure 601 which may be directly connected to the peripheral step 303f of the bottom 303b of the yoke 303 by using adhesive. According to an embodiment of the present invention, the inner ring structure 601 may be a continuous ring structure or a discontinuous ring structure. According to an embodiment of the present invention, the elastic member 60 may include an outer ring structure 602, which may be directly connected to the bottom surface S0 of the frame 10 by using adhesive. According to an embodiment of the present invention, the outer ring structure 602 may be a continuous ring structure or a discontinuous ring structure.

According to an embodiment of the present invention, the elastic member 60 may include a cantilever 603 distributed between the inner ring structure 601 and the outer ring structure 602, wherein the inner ring structure 601 and the outer ring structure 602 are only connected through the cantilever 603. In other words, except for the cantilever 603, the area between the inner ring structure 601 and the outer ring structure 602 is a hollow part. According to an embodiment of the present invention, the width W1 of the elastic member 60 across the yoke 303 and the frame 10 is greater than the width W2 of the surround 202 of the drum paper 20 to provide a more stable suspension function.

According to an embodiment of the present invention, the elastic member 60 is an integrally formed structure, for example, may be stamped from a single metal sheet or a plastic sheet, but is not limited thereto. According to an embodiment of the present invention, as shown in FIG. 9 and FIG. 11, the outer edge of the peripheral step 303f of the bottom 303b of the yoke 303 is lowered by another step, and an annular recessed structure 303r is provided, thereby providing a buffer space R between the annular recessed structure 303r and the elastic member 60, in order to prevent the elastic member 60 from colliding with the bottom 303b of the yoke 303 when vibrating.

According to an embodiment of the present invention, a positioning recess 602r can be provided on the outer ring structure 602 of the elastic member 60, and corresponding to the positioning recess 602r, a positioning protrusion 10r can be provided on the frame 10, which is convenient for positioning during assembly, in order to increase the assembly efficiency and improve the stability of the elastic member 60. According to an embodiment of the present invention, the length of the cantilever 603 of the elastic member 60 can be adjusted to achieve the desired vibration effect.

As shown in FIG. 11, the linear distance between the relative joints of the cantilever 603 of the elastic member 60 between the inner ring structure 601 and the outer ring structure 602 is D, and the actual length between the relative joints of the cantilever 603 of the elastic member 60 between the inner ring structure 601 and the outer ring structure 602 is L, wherein L/D is about 1 to 3. By adjusting the L/D ratio, the strength of the elastic member 60 and the stability during vibration can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A micro-speaker, comprising:

a frame;

a drum paper comprising a diaphragm and a surround, wherein the diaphragm is flexibly connected to one end of the frame via the surround, thereby forming a first suspension system;

a magnetic structure comprising a main magnetic portion and a yoke covering and surrounding the main magnetic portion, wherein a magnetic gap is provided between the main magnetic portion and a folded portion of the yoke;

a voice coil sleeved on an outer periphery of the main magnetic portion and penetrates into the magnetic gap, wherein one end of the voice coil is fixedly connected to the diaphragm; and a one-piece elastic member flexibly connected to a first surface of a bottom of the yoke and a bottom surface of the frame, thereby forming a second suspension system.

2. The micro-speaker according to claim 1, wherein no opening is provided at the bottom of the yoke.

3. The micro-speaker according to claim 1, wherein the first surface is coplanar with the bottom surface of the frame.

4. The micro-speaker according to claim 1, wherein a width of the one-piece elastic member is greater than a width of the surround.

5. The micro-speaker according to claim 1, wherein the one-piece elastic member is an integrally formed structure.

6. The micro-speaker according to claim 5, wherein the one-piece elastic member is a ring structure.

7. The micro-speaker according to claim 6, wherein the one-piece elastic member is a continuous ring structure.

8. The micro-speaker according to claim 6, wherein the one-piece elastic member is a discontinuous ring structure.

9. The micro-speaker according to claim 5, wherein the one-piece elastic member is made of a metal sheet, a plastic sheet, a rubber sheet or a paper sheet.

10. The micro-speaker according to claim 5, wherein the one-piece elastic member comprises an inner ring structure, an outer ring structure, and a cantilever connecting the inner ring structure and the outer ring structure.

11. The micro-speaker according to claim 10, wherein the inner ring structure is directly connected and fixed on a periphery of the first surface.

12. The micro-speaker according to claim 11, wherein the main magnetic portion is fixed on a second surface of the bottom of the yoke opposite to the first surface.

13. The micro-speaker according to claim 12, wherein a periphery of the bottom of the yoke is provided with an annular recessed structure, forming an annular third surface of the bottom, which is lower than the first surface, thereby providing a buffer space between the annular recessed structure and the one-piece elastic member.

14. The micro-speaker according to claim 10, wherein the outer ring structure is provided with a positioning recess, and corresponding to the positioning recess, the frame body is provided with a positioning protrusion, to facilitate positioning during assembly.

15. The micro-speaker according to claim 10, wherein a linear distance between relative joints of the cantilever of the elastic member between the inner ring structure and the outer ring structure is D, and an actual length between the relative joints of the cantilever of the elastic member between the inner ring structure and the outer ring structure is L, wherein L/D is 1 to 3.

16. The micro-speaker according to claim 1, wherein the yoke has a central opening.

17. The micro-speaker according to claim 16, wherein the central opening is a long and narrow through-hole extending along a long axis of the yoke, and the central opening runs through an entire thickness of the yoke.

18. The micro-speaker according to claim 16, wherein an elastic material is disposed in the central opening.

19. The micro-speaker according to claim 18, wherein the elastic material comprises foam or rubber.

20. The micro-speaker according to claim 16, wherein one end of the central opening is covered by the main magnetic portion fixed on the yoke.

* * * * *